United States Patent [19]

Mann

[11] Patent Number: 5,644,772

[45] Date of Patent: Jul. 1, 1997

[54] SIGNAL DISPATCHING FOR C LANGUAGE INTERRUPT HANDLING

[75] Inventor: Daniel Mann, Austin, Tex.

[73] Assignee: Advanced Micro Devices, Inc., Sunnyvale, Calif.

[21] Appl. No.: 643,264

[22] Filed: May 3, 1996

Related U.S. Application Data

[63] Continuation of Ser. No. 289,512, Aug. 12, 1994, abandoned.

[51] Int. Cl.$^6$ ............................................. G06F 9/46
[52] U.S. Cl. ............................................. 395/733; 395/736
[58] Field of Search ................................... 395/733, 735, 395/736, 737

[56] References Cited

U.S. PATENT DOCUMENTS

| | | | |
|---|---|---|---|
| 4,326,247 | 4/1982 | Chamberlin | 395/800 |
| 4,327,410 | 4/1982 | Patel et al. | 395/425 |
| 4,761,732 | 8/1988 | Eldumiati et al. | 395/736 |
| 5,291,608 | 3/1994 | Flurry | 395/736 |
| 5,355,503 | 10/1994 | Soffel et al. | 395/750 |
| 5,369,768 | 11/1994 | Takano | 395/725 |
| 5,437,039 | 7/1995 | Yuen | 395/650 |

OTHER PUBLICATIONS

Daniel Mann, "A Short Cut: C Language Interrupt Handlers," Fusion 29K News, Issue 13, Mar. 1993.

Primary Examiner—Jack B. Harvey
Assistant Examiner—Jeffrey K. Seto
Attorney, Agent, or Firm—Haynes and Boone, L.L.P.

[57] ABSTRACT

A system for handling multiple nested interrupts in a microprocessor device using C language interrupt handlers in which each interrupt handler is executed in two distinct stages, which are a Freeze mode handler and a signal handler, is disclosed. Upon the occurrence of each interrupt, a microprocessor of the device is placed in Freeze mode and the appropriate Freeze mode handler responds immediately to the interrupt, capturing all critical data and deactivating the interrupt request. Once the Freeze mode handler has completed execution, if execution of the signal handler is not necessary, an "interrupt return" or "IRET" instruction is executed, causing execution to return to the point at which the interrupt occurred. Otherwise, a signal number of the appropriate signal handler is pushed onto a signal stack stored in a memory associated with the microprocessor and a determination is made as to whether the signal dispatcher is running. If so, an IRET instruction is executed; otherwise, the microprocessor exits Freeze mode, C level context is prepared and execution of the signal dispatcher is initiated. The signal dispatcher continually checks the signal stack, pops the next signal number from the stack, and calls the associated signal handler, which is executed to completion, at which point the signal dispatcher again checks the stack. This continues until the stack is empty, at which point the signal dispatcher is exited, C level context is restored, and execution returns to the point at which the initial interrupt occurred.

22 Claims, 3 Drawing Sheets

SIGNAL DISPATCHING FOR C LANGUAGE INTERRUPT HANDLING

This is a continuation of application(s) Ser. No. 08/289,512 filed on Aug. 12, 1994 now abandoned.

NOTICE OF COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The invention relates generally to microprocessor devices and, more particularly, interrupt handling in microprocessor devices.

BACKGROUND OF THE INVENTION

A typical computer system includes a microprocessor for executing applications software and other code stored in a memory of the computer system. When an interrupt occurs during software execution, the microprocessor must suspend execution of the code it is presently executing, save its place, and search a table stored in memory that lists "interrupt vectors." Each interrupt vector is a pointer that indicates to the microprocessor the location in memory of code for servicing the interrupt, known as the "interrupt handler." The microprocessor reads the value of the associated vector and begins executing the code stored at the memory location indicated by the vector. However, prior to doing so, the computer system hardware and/or the interrupt handler typically save the state, or "context," of the microprocessor registers, which will be destroyed by the interrupt handler if the interrupt handler makes use of those registers. Before the microprocessor resumes execution of the interrupted code, the interrupt handler and/or the system hardware restore the saved registers. As saving and restoring the context of a microprocessor is well known in the art, the specifics of these operations are not further described in greater detail herein.

Saving the state, or context, of the microprocessor upon the occurrence of an interrupt increases interrupt latency, which is defined as the amount of time that elapses between the time the microprocessor takes the interrupt and begins to execute the interrupt processing code. Interrupt processing code is that part of the interrupt handler that is not related to register saving and restoration. To increase system speed, it is highly desirable to reduce interrupt latency, as well as register restoration time at the completion of the interrupt processing code. Reducing interrupt latency and register restoration time is particularly important where interrupt handlers are executed with interrupts disabled, as other interrupts may be missed during execution of the interrupt handler.

The Am29K family of embedded products, designed and manufactured by Advanced Micro Devices (AMD) of Sunnyvale, Calif., comprises a growing group of 32-bit reduced-instruction set (RISC) microprocessors (hereinafter "29K microprocessors"). 29K microprocessors employ submicron circuits to increase the degree of system integration, yielding very low system cost. Dense circuitry and a large number of on-chip peripherals, such as an on-chip timer, minimize the number of components required to implement embedded systems, while providing performance superior to that of complex-instruction-set (CISC) microprocessors.

Embedded code application developers are typically required to deal with interrupts from peripheral devices requiring attention. Compared to CISC microprocessors, which typically do not have a register stack, interrupt handling is slightly more difficult to achieve with microprocessors, such as 29K microprocessors, that do have a register stack that must be considered when handling interrupts. In addition, such microprocessors typically do not have microcode to save automatically their interrupted context, or state, to enable the microprocessor to continue execution from the point at which the interrupt occurred upon completion of the associated interrupt handler.

As described at section 16.2 through 16.4 of the "Am29200™ and Am29205™ RISC Microcontrollers User's Manual, Rev. 1, 1994," published by AMD (hereinafter "User's Manual") and herein incorporated by reference in its entirety, 29K microprocessors include a number of protected special purpose registers. One such register is the Current Processor Status (CPS) register, which controls the behavior of the microprocessor and its ability to recognize exceptional events. The CPS register includes a bit known as the Freeze (FZ) bit that, when set, prevents certain critical registers from being updated during interrupt processing, except by explicit data movement. The FZ bit is set whenever an interrupt is taken, holding the critical state, or context, of the microprocessor so that it cannot be unintentionally modified by the interrupt handler. Setting the FZ bit places the microprocessor in "Freeze mode." Section 16.4 of the User's Manual describes in detail typical interrupt trap handling using the FZ bit.

When writing interrupt handlers for microprocessors, most code developers prefer to use C language, rather than assembly language, for obvious reasons, and various methods are known to in the art for associating C language interrupt handler with a 29K microprocessor interrupt. For example, as described in an article by Daniel Mann entitled "A Short Cut: C Language Interrupt Handlers," published in Fusion29K NEWS, Issue 13 (March 1993) (hereinafter "Mann article"), which is herein incorporated by reference in its entirety, a special code segment, referred to as "trampoline code," is included in the library code supplied with 29K microprocessors for connecting a Freeze mode interrupt handler with the required C level code. The trampoline code is called by the Freeze mode interrupt handler after C level context of the microprocessor has been prepared. As used herein "preparing" or "saving" C level context constitutes saving the contents of critical registers on the memory stack and preparing the register stack for further use by the interrupt handler, as interrupts may occur at times when the condition of the register stack is such that it is not immediately usable by a C language handler. "Restoring" C level context is the reverse of this process. In general, C level context must have been prepared in response to each interrupt to save the state of the microprocessor at the time the interrupt occurs so that, once the interrupt has been serviced (i.e., the interrupt handler has completed execution), the microprocessor can continue executing instructions from the point at which it was interrupted. As further described in detail below, preparing C level context can be extremely time consuming, especially where multiple nested interrupts must be processed.

FIG. 1 is a timing diagram illustrating a typical prior art method implemented by a microprocessor, such as a 29K microprocessor, for handling multiple nested interrupts using C language interrupt handlers. Prior to time T1, the microprocessor is executing a MAIN code segment, or program, 100a, 100b. At time T1, after only a first portion 100a of the MAIN code segment 100a, 100b has been executed, a first interrupt I1 occurs. Responsive to I1, the microprocessor is placed in Freeze mode, that is, the FZ bit of the CPS register is set and C level context is prepared. Preparing C level context involves pushing all critical registers onto the memory stack to save the state of the microprocessor at time T1 and preparing the register stack for use by C language, or C level, interrupt handler code associated with I1, designated by reference numerals 102a, 102b. Typically, as much as 40–70 microseconds (μs) may be spent in preparing C level context before the interrupt processing code of a C language interrupt handler, such as the I1 interrupt handler 102a, 102b, may begin execution. Referring again to FIG. 1, after C level context is prepared at time T1, the I1 interrupt handler 102a, 102b begins execution. At time T2, after only a first portion 102a of the I1 interrupt handler 102a, 102b has been executed, a second interrupt I2 occurs. Responsive to I2, the microprocessor is again placed in Freeze mode and C level context must again be prepared, so that the unexecuted portion 102b of the I1 handler 102a, 102b may be executed upon completion of an interrupt handler associated with I2, designated by reference numerals 104a, 104b.

At this point, the I2 interrupt handler 104a, 104b begins execution. At time T3, after only a portion 104a of the I2 handler 104a, 104b has been executed, a third interrupt I3 occurs. Responsive to I3, the microprocessor is again placed in Freeze mode and C level context of the microprocessor must once again be prepared, so that the unexecuted portion 104b of the I2 interrupt handler 104a, 104b may be executed upon completion of an interrupt handler associated with I3, designated by the reference numeral 106. At time T4, execution of the I3 handler 106 is complete and the C level context previously saved at time T3 is restored. At this point, the remaining portion 104b of the I2 handler 104a, 104b is executed. At time T5, execution of the I2 handler 104a, 104b is complete and the context previously saved at time T2 is restored. At this point, the remaining portion of the I1 handler 102a, 102b is executed. At time T6, execution of the I1 handler 102a, 102b is complete, the context saved at time T1 is returned, and the microprocessor resumes execution of the unexecuted portion 100b of the MAIN code segment 100a, 100b. As a result, the interrupts are completed in the reverse order in which they were received.

It should be understood that, although only three nested interrupts are shown in FIG. 1, any number of nested interrupts could occur, each requiring C level context to be saved and restored before and after execution of the associated interrupt handler. Assuming, as is typically the case, that the amount of time needed to restore C level context is equal to that needed to prepare same (i.e., 40–70 μs), it is apparent that for each interrupt serviced by a C language interrupt handler, m approximately 80–140 μs will be expended in simply preparing for and returning from the interrupt. Clearly, the greater the number iof nested interrupts expected, the greater the cost, in terms of clock cycles, of preparing C level context for interrupt processing and the greater the benefit to be realized in avoiding such nested interrupts. In addition, interrupt latency will alwayx be at least 40–70 μs, i.e., the time required to prepare C level context.

Accordingly, what is needed is a method of processing multpile nested interrupts using C leanguage handlers which substantially reduces interrupt latency and increases the speed with which multiple nested interrupts may be processed.

SUMMARY OF THE INVENTION

The foregoing problems are solved and a technical advance is achieved by a system of the present invention for handling interrupts, especially multiple nested interrupts, in a microprocessor device using C language interrupt handlers. In a departure from the art, each interrupt handler is executed in two distinct stages. When an interrupt occurs, a first stage of an interrupt handler associated therewith is immediately executed. This first stage, referred to as the "Freeze mode handler" because it executes in a Freeze mode of the microprocessor, responds immediately to the interrupt, capturing all critical data and deactivating the interrupt request. A second stage, referred to as the "signal handler," if required, is called by a "signal dispatcher" and contains the bulk of the interrupt processing code of the interrupt handler.

In a preferred embodiment, upon the occurrence of an interrupt, the microprocessor is placed in Freeze mode and the appropriate Freeze mode handler is executed. Once the Freeze mode handler has completed execution, a determination is made whether execution of the signal handler is necessary. If not, the microprocessor is removed from Freeze mode and an "interrupt return" or "IRET" instruction is executed, causing execution to return to the point at which the interrupt occurred. Otherwise, a signal number for identifying the appropriate signal handler is pushed onto a signal stack stored in a memory associated with the microprocessor and a determination is then made as to whether the signal dispatcher, which is executed as a signal handler, is running. If the signal dispatcher is running, indicating that the interrupt is not the first interrupt in a series of nested interrupts, the microprocessor is removed from Freeze mode and an IRET instruction is executed. If the signal dispatcher is not running, as will be the case if the interrupt is the first in a series of nested interrupts, the microprocessor is removed from Freeze mode, C level context is prepared and execution of the signal dispatcher is initiated.

While the signal dispatcher is executing, it continually checks the signal stack, pops the next signal number from the stack in a first-in/first-out (FIFO) manner, and calls the associated signal handler, it being understood that the Freeze mode handlers of interrupts occurring during execution of a signal handler called by the signal dispatcher will push additional signal numbers onto the stack, which signal numbers will be successively accessed by the signal dispatcher, in the order of the occurrence, once execution of the signal handler associated with the immediately preceding signal number is complete. This continues until the stack is empty, at which point the signal dispatcher is exited, C level context is restored, and execution returns to the point at which the initial interrupt occurred.

In one embodiment, the signal dispatcher removes a group of signal numbers from the signal stack at once and stores them in an array in the memory. This transfer operation is performed with interrupts disabled, to prevent additional signal numbers from being added to the stack during that time. In this embodiment, instead of accessing signal numbers directly from the stack, the signal dispatcher accesses them from the array, in the order in which they occurred, and calls the appropriate signal handler, as described above.

In another embodiment, a group of signals may be removed from the signal stack, prioritized based on any preselected criteria, and then stored in an array in the order of their priority. In this manner, the signal dispatcher will call the signal handlers in order of priority.

A technical advantage achieved with the invention is that it significantly decreases interrupt latency, as it is seldom necessary to disable interrupts for long periods of time.

A further technical advantage achieved with the invention is that it increases the overall speed with which multiple nested interrupts using C language interrupt handlers may be processed, as C-level microprocessor context need only be prepared and restored before and after execution of the signal dispatcher routine, which then calls the appropriate signal handlers to service the interrupts, rather than before and after execution of each interrupt handler. Accordingly, C level context is only prepared and restored once for a series of nested interrupts, regardless of the number of interrupts in the series.

DETAILED DESCRIPTION OF THE PREFERRED EMBODIMENT

Figures 1, 2:
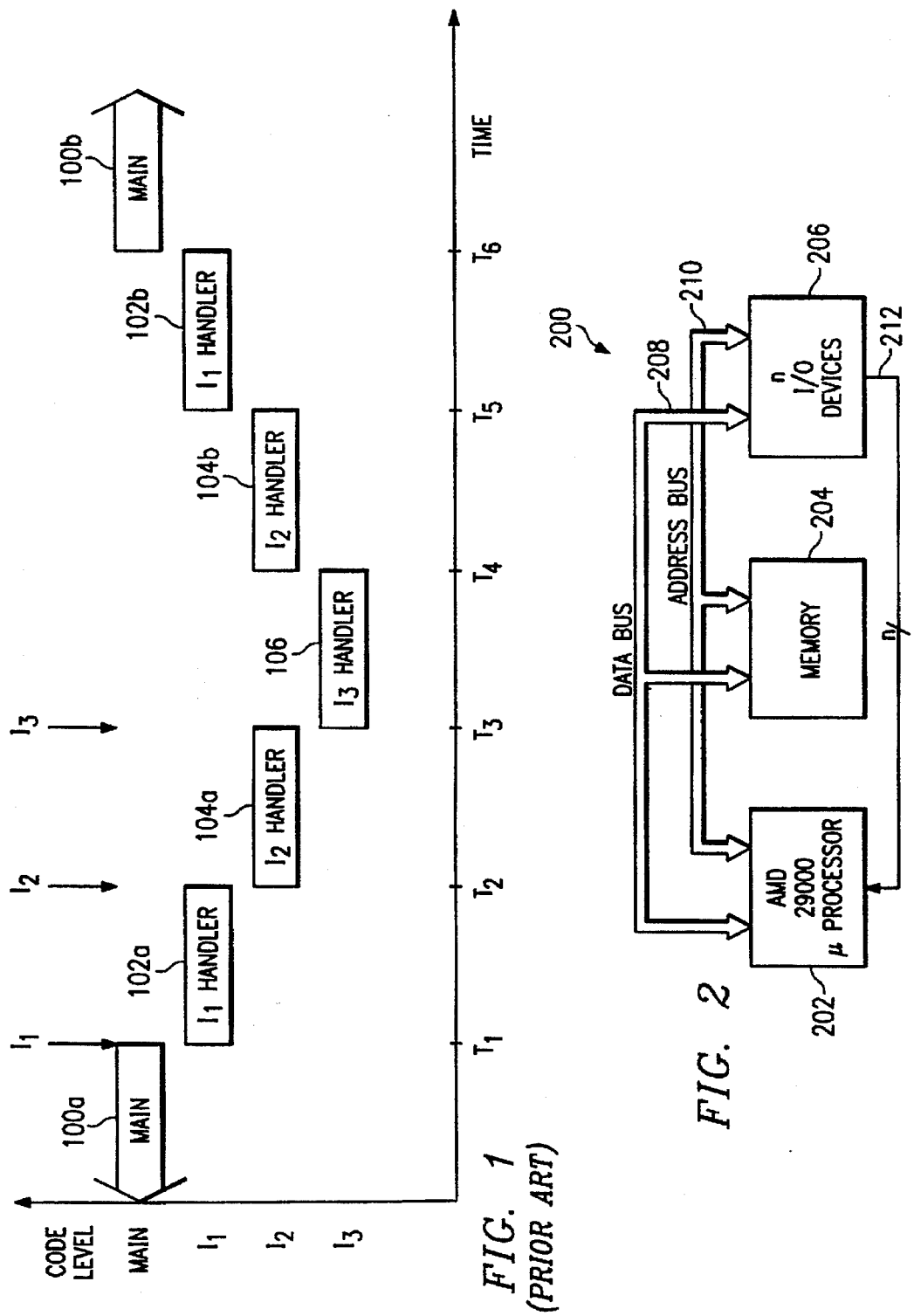
FIG. 1 is a timing diagram illustrating a typical prior art method implemented by a microprocessor for handling multiple nested interrupts using a C language interrupt handlers.
FIG. 2 is a block diagram of a system for implementing the method of the present invention.

As previously described in detail, FIG. 1 is a timing diagram illustrating a prior art method of servicing multiple nested interrupts. More specifically, FIG. 1 illustrates a prior art method of handling three nested interrupts, I1, I2 and I3, using C language interrupt handlers, in which C level context must be prepared and restored for each of the I1, I2 and I3 interrupt handlers.

FIG. 2 is a block diagram of a microprocessor device 200 for implementing the method of the present invention. In a preferred embodiment, the device 200, which may be, for example, a computer system, includes an AMD 29000 microprocessor 202, memory 204 and n I/O devices, collectively designated by reference numeral 206, interconnected in a conventional manner via data and address buses 208 and 210, respectively, as well as a plurality of control lines (not shown). It should be understood that the memory 204 may comprise any necessary combination of random access and read only memory (RAM and ROM). Each of the I/O devices 206 are further connected to the microprocessor 202 via one of n interrupt lines, collectively designated by the reference numeral 212. It should be understood that the microprocessor 202 may be any microprocessor or microcontroller in the AMD 29K family; alternatively, the microprocessor 202 may be any microprocessor that is capable of operating in a mode equivalent to the "Freeze mode" of 29K processors. It should also be understood that the microprocessor 202, the memory 204, and one or more I/O devices 206, although shown as separate components, may, and in fact will most likely, reside on a single semiconductor chip (not shown).

In accordance with a feature of the present invention, each C language interrupt handler to be executed by the microprocessor 202 is divided into two segments, or "stages." The first stage of each interrupt handler, referred to as the "Freeze mode handler" because it is executed while the processor 202 is in Freeze mode, responds immediately to the interrupt, capturing any critical data, pushing a signal number for identifying the second stage of the interrupt handler onto a special signal stack, or first-in/first-out (FIFO) queue, stored in the memory 204, as will be subsequently described, and deactivating the interrupt request. Although not shown, it should be understood that the signal stack operates as a two-ended list located in the memory 204 with push operations being performed on the first end and pop operations being performed on the second end. In a preferred embodiment, as will be described, in some instances, the Freeze mode handler will include code for determining whether execution of the second stage of the interrupt handler is even necessary. The second stage, or "signal handler," includes most, if not all, of the interrupt processing code for actually servicing the interrupt.

The present invention also makes use of a novel routine referred to as a "signal dispatcher," which in the preferred embodiment is implemented as a signal handler. As will be described, execution of the signal dispatcher is initiated by the first interrupt in a series of nested interrupts, at which point C level context must be prepared. From that point on, so long as the signal dispatcher is running, the signal dispatcher is responsible for calling the appropriate second stage for each interrupt, as indicated by the signal numbers in the signal stack. Hence, because the appropriate signal handlers are called by the signal dispatcher, the need to prepare and restore C level context for each interrupt is eliminated.

Figure 3:
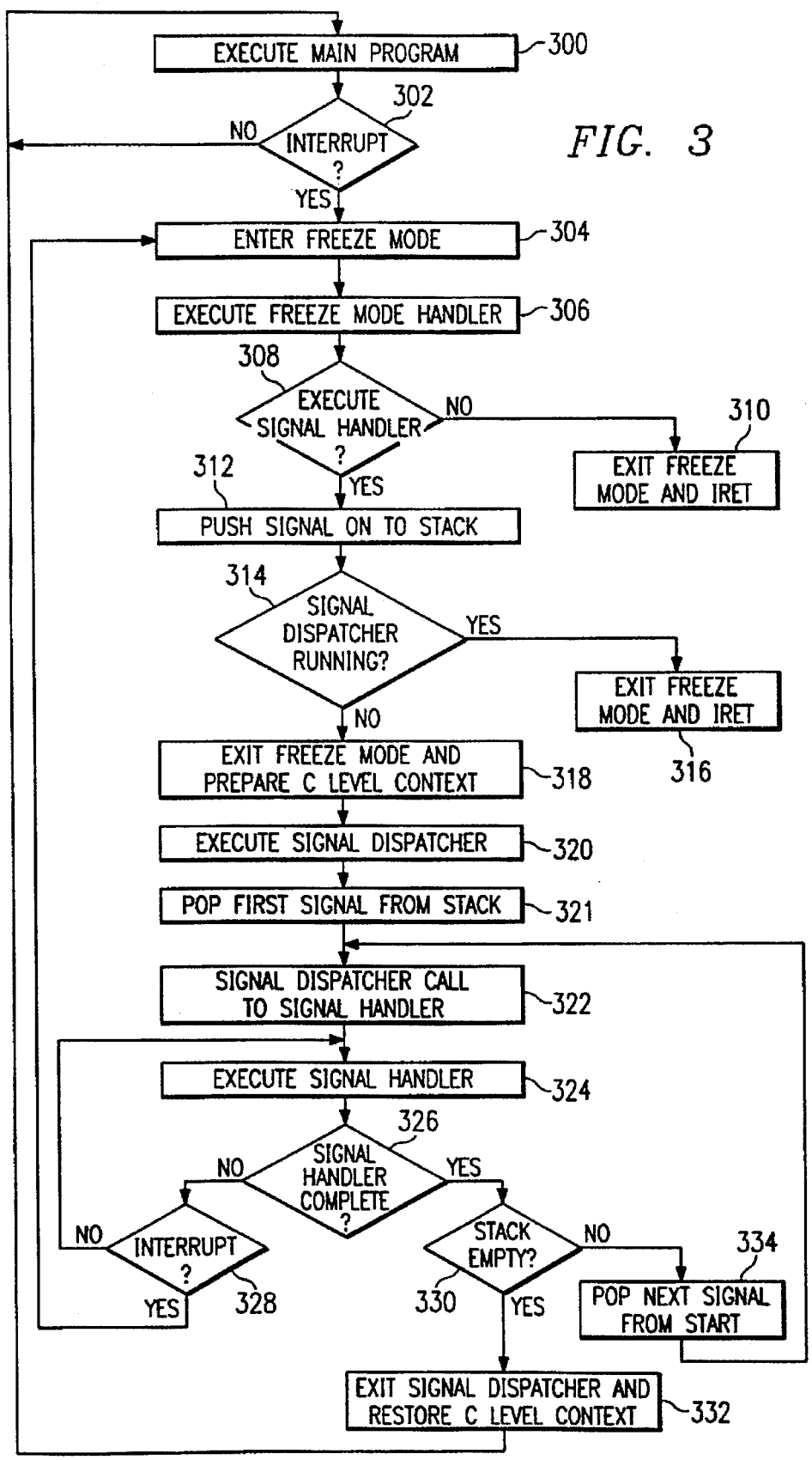
FIG. 3 is a flowchart of a method implemented by a microprocessor for handling multiple nested interrupts using C language interrupt handlers embodying features of the present invention.

FIG. 3 is a flowchart of the interrupt handling method of the present invention. It should be understood that microcode instructions for operating the device 200 in accordance with the logic shown in the flowchart of FIG. 3, in addition to other program and interrupt handler code executed by the microprocessor 202, are stored in the memory 204. In step 300, the microprocessor 202 is executing a MAIN code segment. In step 302, a determination is made whether an interrupt signal has been received by the microprocessor 202 on one of the interrupt lines 212, indicating that the one of the I/O devices 206 associated with the asserted line needs to be serviced. If it is determined that no interrupt has been received, execution returns to step 300 and the microprocessor 202 continues executing the MAIN code segment. Otherwise, execution proceeds to step 304. In step 304, the microprocessor 202 is placed in Freeze mode by setting the FZ bit of the CPS register, as described above. In step 306, the microprocessor 202 executes the first stage (i.e., the Freeze mode handler) of the interrupt handler associated with the current interrupt.

In step 308, a determination is made whether execution of second stage of the interrupt handler (i.e., the signal handler) is necessary. If it is determined that execution of the signal handler is not necessary, execution proceeds to step 310, in which the microprocessor is removed from Freeze mode by resetting the FZ bit and a "return from interrupt" or "IRET" instruction is executed, causing execution to return to the point at which the interrupt occurred. If in step 308 it is determined that execution of the associated signal handler is necessary, execution proceeds to step 312, in which the signal number of the signal handler is pushed onto the signal stack (not shown) in the memory 204, and then proceeds to step 314. In step 314, a determination is made whether the signal dispatcher is running. If it is determined that the signal dispatcher is running, execution proceeds to step 316, in which the microprocessor 202 is removed from Freeze mode and an IRET instruction is executed, causing execution to return to the point at which the interrupt occurred. Otherwise, execution proceeds to step 318.

In step 318, the microprocessor 202 is removed from Freeze mode and C level context is prepared in the manner previously described. In step 320, execution of the signal dispatcher is initiated. In step 321, the signal dispatcher pops the first signal number from the stack and, in step 322, the signal dispatcher calls the associated signal handler. In step 324, the signal handler is executed. In step 326, a determination is made whether the signal interrupt handler has been completely executed. If not, execution proceeds to step 328. In step 328, a determination is made whether another interrupt has occurred. If not, execution returns to step 324, in which the signal handler continues executing. If in step 328 it is determined that another interrupt has occurred, execution returns to step 304.

If in step 326 it is determined that the signal handler has been completely executed, execution proceeds to step 330. In step 330, the signal stack is checked and a determination is made whether the stack is empty, indicating that there are no more interrupts to be processed. If in step 330, the stack is empty, execution proceeds to step 332, in which the signal dispatcher is exited and C level context, which was prepared in step 318, is restored. Execution then returns to step 300. If in step 330, it is determined that the stack is not empty, indicating that additional interrupts have occurred and remain to be processed, execution proceeds to step 334, in which the next interrupt signal is popped from the stack, and then returns to step 322.

In one embodiment, it may be desirable for the signal dispatcher to remove a group of signal numbers from the stack and then store them in an array in the memory 204 in the reverse order in which they were added to the stack, to ensure that they are processed in the order in which they were received. This transfer operation is performed with interrupts disabled, to prevent the addition of signals to the stack while the transfer operation is being performed. Once the transfer is complete, interrupts are reenabled and the dispatcher then accesses the signal numbers from the array and call the associated signal handlers in the order in which the interrupts were received. This embodiment may prove more practical in situations in which interrupts are expected to occur much more quickly than they can be processed by the signal dispatcher.

In another embodiment, the signals may be prioritized in the stack or in the array, such that signal numbers corresponding to higher priority interrupts are accessed first. However, due to the fast operation of 29K microprocessors, the need to prioritize signals is not great, as an interrupt is not likely to be kept waiting very long before being serviced.

Figure 4:
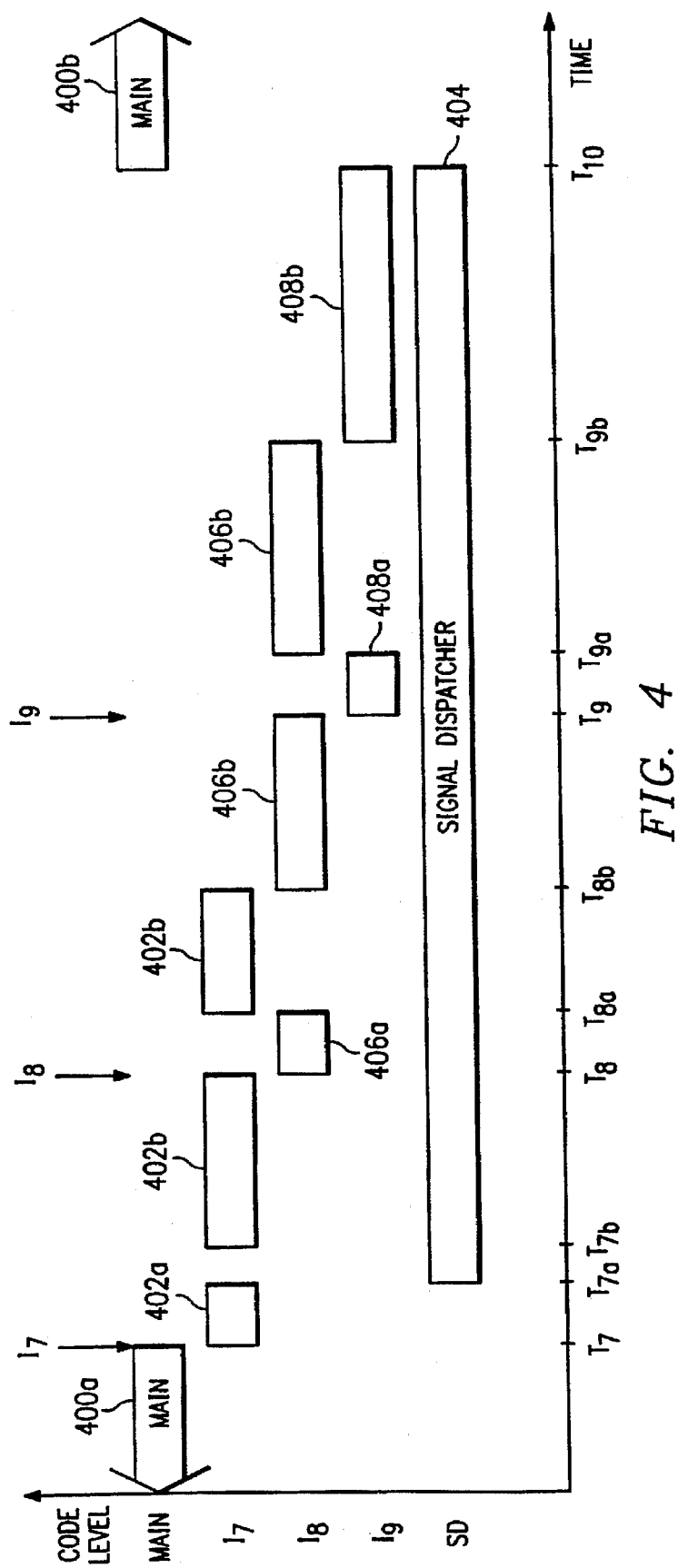
FIG. 4 is a timing diagram of the method of FIG. 3.

FIG. 4 is a timing diagram illustrating the interrupt handling method of the present invention for servicing three nested interrupts using C language interrupt handlers. Prior to time T7, the microprocessor 202 is executing a first portion 400a of a MAIN code segment 400a, 400b. At time T7, a first interrupt I7 occurs. At that point, the microprocessor 202 is placed in Freeze mode and the first stage of the interrupt handler associated with I7, designated as the I7 Freeze mode handler 402a, is executed. As previously described, the I7 Freeze mode handler 402a captures any critical data, pushes a signal number for identifying the second stage of the I7 interrupt handler onto the signal stack in the memory 204 and deactivates the interrupt request.

At time T7a, the microprocessor 202 is removed from Freeze mode, C level context is prepared and execution of a signal dispatcher 404 is initiated. At time T7b, the signal dispatcher 404 pops the I7 interrupt signal number off of the stack and calls the second stage of the I7 signal handler, designated as the I7 signal handler 402b. At time T8, a second interrupt I8 occurs. At this point, the microprocessor 202 is placed in Freeze mode and the first stage of the interrupt handler for I8, designated as the I8 Freeze mode handler 406a, is executed. Similar to the I7 Freeze mode handler 402a, the I8 Freeze mode handler 406a captures any critical data, pushes a signal number for identifying the second stage of the I8 interrupt handler onto the stack and deactivates the interrupt request. At time T8a, execution of the I8 Freeze mode handler 406a is complete and the microprocessor 202 is removed from Freeze mode and returns to execution of the I7 signal handler 402b. It should be noted that, because the signal dispatcher 404 is already running, C level context need not be prepared at time T8a.

At time T8b, execution of the I7 signal handler 402a is complete and control returns to the signal dispatcher 404, which pops the next signal number (i.e., the I8 interrupt signal number) off the stack and calls the second stage of the interrupt handler associated therewith, designated as the I8 signal handler 406b. At time T9, a third interrupt I9 occurs. At this point, the microprocessor 202 is placed in Freeze mode and the first stage of the interrupt handler for I9, designated as the I9 Freeze mode handler 408a, is executed. Again, the I9 Freeze mode handler 408a captures any critical data, pushes a signal number for identifying the second stage of the I9 interrupt handler onto the stack and deactivates the interrupt request. At time T9a, the I9 Freeze mode handler 408a has completed execution and the microprocessor 202 is removed from Freeze mode and returns to execution of the I8 signal handler 406b. Again, because the signal dispatcher 404 is already running, C level context need not be prepared at time T9a.

At time T9b, execution of the I8 signal handler 406b is complete and control is returned to the signal handler 404, which pops the next signal number (i.e., the I9 interrupt signal number) off of the stack and calls the second stage of the interrupt handler associated therewith, i.e., the I9 signal handler 408b. At time T10, execution of the I9 signal handler is complete and control is returned to the signal dispatcher 404. At this point, because the signal stack is empty, C level context is restored and the microprocessor 202 returns to execution of the remaining portion 400b of the MAIN code segment 400a, 400b.

The most obvious advantage afforded by the interrupt handling method of the present invention is the savings in time spent preparing and restoring C level context in servicing multiple nested interrupts that use C language interrupt handlers. For example, referring to FIGS. 1 and 4, which respectively illustrate a prior art method for servicing three nested interrupts using C language interrupt handlers and the method of the present invention for servicing same, it is clear that, as previously described in detail, using the prior art method, C level context must be prepared and restored for each of the three interrupts. As a result, assuming the same amount of time is needed to prepare and to restore C level context, a total of approximately 240 to 420 μs is spent preparing and restoring C level context to process the three interrupts I1, I2 and I3. In contrast, using the method of the present invention, C level context is only prepared and restored once; therefore, only 80 to 140 μs are spent preparing and restoring C level context to process the three interrupts I7, I8 and I9.

It should also be noted that, with regard to the method of the present invention, the number of nested interrupts which occur has no effect on the amount of time spent in preparing and restoring C level context, as C level context must be prepared and restored only once, regardless of the number of interrupts. In contrast, using the prior art method, as illustrated in FIG. 1, an additional 80 to 140 μs will be needed to prepare and restore C level context for each additional nested interrupt that occurs. Accordingly, the time savings that can be achieved by using the method of the present invention increases substantially with the number of nested interrupts which are expected to occur.

Although it is understood that the above-described method may be implemented in code in any number of different manners, a particular, albeit exemplary, embodiment is shown and described below for implementation in a 29K processor. In this illustrative embodiment, for each interrupt that occurs, the appropriate signal handler is requested by the associated Freeze mode handler's setting a particular variable, for example sig_sig, to the signal number associated with the interrupt to cause the signal to be added to the signal stack in the memory 204. Setting the sig_sig variable to a signal number ORed with 0x80000000 indicates that the signal should be queued, if necessary, rather than processed immediately.

An exemplary Freeze mode handler, designated uart_handler(), for handling an interrupt from a uniform asynchronous receiver transmitter (UART) connected to the microprocessor 202 as one of the I/O devices 206 is shown below:

```
_Interrupt uart_handler( )     /*Freeze mode interrupt handler*/
{
    static int count=0;
    recv[count] = *uart_p;     /*access UART*/
    if (recv[count]=='\n')     /*end of string?*/
    {   count=0;
        sig_sig=0x80000000 | uart_sig;
    }
    else count++;
}
```

The above UART Freeze mode handler code causes the signal number associated with the second stage of the UART interrupt handler, or the UART signal handler, to be pushed onto the signal stack when the end of a character string is reached. Hence, although a UART interrupt is generated, and therefore the UART Freeze mode handler is executed, upon receipt of each character in the character string, the UART signal handler need only be executed when the end of the string is reached. This code segment illustrates the functionality and usefulness of including step 308 in the flowchart of FIG. 3.

Another exemplary Freeze mode handler, designated timer_handler(), for handling interrupts from a timer, typically an on-chip timer, connected to the microprocessor 202 as one of the I/O devices 206 is shown below:

```
_Interrupt timer_handler( )        /*Freeze mode interrupt
                                    handler*/
{
    static int tick=0;
    int tmr;
    tmr=_mfsr(9);                  /*read TMR special
                                    register*/
    tmr=tmr&(-1-0x02000000);       /*clear IN bit-field*/
    _mtsr(9,tmr);                  /*write to TMR register*/
    if(tick++ > 100)
    {   tick=0;
        sig_sig=0x80000000 | timer_sig;
    }
}
```

The timer Freeze mode handler reloads timer control registers for repeated timer operation. Each timer interrupt causes the value of the tick variable to be incremented and when the value of tick reaches 100, the value held in the variable timer_sig is added to the signal queue. It should be noted that, because the timer Freeze mode handler is written in C, but needs access to a special register of the microprocessor 202 not normally accessible from C, C language extensions _mfsr() and _mtsr(), which enable the special register to be accessed, are used.

Exemplary code for implementing the second stage of the UART interrupt handler, or the UART signal handler, sig_uart(), is shown below. It should be noted that the routine calls the C language printf() library routine, which is not permitted with the High C 29K library routines, as the printf() routine is not reentrant. However, because the printf() routine helps illustrate the operating principle of the present invention, it is used herein.

```
_Interrupt sig_uart(sig_number)     /*signal handler for UART*/
int     sig_number
{
    printf("in signal handler number=%d\n", sig_number);
    printf("received string=%s\n", recv_data);
    if (!dispatcher_running)_sigret( ); /*no_sigret( )
        service call*/
}
```

As is known by those skilled in the art, normally, an interrupt handler must use the _sigret() signal return service, at least with certain operating san HIF conforming operating system; however, when a signal handler is called by signal dispatcher code (shown below), the signal return service should not be used.

In the preferred embodiment, it is possible to determine whether the dispatcher is running by testing a dispatcher_running flag, which is set to zero when the dispatcher in use; however, testing this flag many be insufficient in some cases. For example, it is possible that the signal dispatcher is running and initiating signal handler execution. At the same time, a signal handler may be requested directly by, for example, an interrupt. In this case, although the dispatcher is running, the directly requested signal must use the signal return service.

In addition, signals need not always be queued for processing. For example, if a very high priority interrupt occurs and further processing is necessary, sig_sig may simply be set to the associated signal number. In this case, it is important that the signal handler use the sigret() service.

In the preferred embodiment, the signal dispatcher is implemented as a specialized signal handler. The dispatcher pops signal numbers from the signal stack and calls the appropriate signal handler. When a second stage interrupt handler is requested by a Freeze mode handler and the signal dispatcher is not already executing, the requested second stage signal handler is not immediately started; instead, the signal dispatcher is initiated.

A dispatcher_sig variable holds the signal number of the signal dispatcher, which signal number may be designated by a user but which in the example below is "7" (SIGEMT). A signal() routine supplied with the 29K library is used to assign a procedure sig_dispatcher() to the signal number. As is well known in the art, before interrupt handlers can be installed, the procedures and variables defined in the support libraries must be declared external.

During program initialization, after a main() function is called, the handler routines and other support services must be installed. The code shown below uses an interrupt() library routine to install a signal handler (sig_timer()) for timer interrupt support. The call to interrupt() returns the associated signal number, which is saved in timer_sig variable. The timer Freeze mode handler (shown above) uses the value stored in timer_sig to request the second stage timer signal handler. The interrupt() service is called a second time to install the Freeze mode handler, timer_handler(). The second call causes a designated vector table entry, in this case, table entry 14, to be reassigned the address of the timer Freeze mode handler.

The UART signal handler is installed via an alternative method. The signal() service, rather than the interrupt() service is used to assign the sig_uart() signal handler to a signal number stored in a variable SIGUSR2. This method allows a specific signal number to be selected, rather than using the interrupt() service to allocate the next available signal number.

```
        .reg    it0, gr64
        .reg    it1, gr65
_signal_associate_code
        const   gr64,0              ;signal number in it0
        ;
        const   it1,0               ;clear sig_sig variable
        const   it2,_sig_sig        ;need not do this if signal
        consth  it2,_sig_sig        ;handler is called directly
        store   0,0,it1,it2         ;from vector table entry const   it1,_queue_sig
        consth  it1,_queue_sig
        jmpti   gr64,it1            ;jump is msb-bit set
        nop
        push    msp,it0             ;interrupt context stack
        push    msp,gr1             ;use 'push' macro
        push    msp,rab             ;see section NO TAG
        const   it0,512
        sub     rab,rfb,it0         ;set rab=rfb-512
        ;
        pushsr  msp,it0,pc0         ;push special registers
        pushsr  msp,it0,pc1
        pushsr  msp,it0,pc2
        pushsr  msp,it0,cha
```

```
main( )
{
    _settrap(218,_disable);
    _settrap(217,_enable)
    _settrap(216,_timer_init);
    dispatcher_sig=7;          /*select signal number for dispatcher*/
    signal(dispatcher_sig,sig_dispatcher);
    timer_sig=interrupt(14,sig_timer);      /*install signal handler*/
    if(interrupt(14,timer_handler))         /*install Freeze mode handler*/
        printf("ERROR: Freeze mode handler not built for trap 14\n");
    if (interrupt(15,uart_handler)          /*install Freeze mode handler*/
        printf("ERROR: Freeze mode handler not built for trap 15/n");
    uart_sig=SIGUSR2
    signal(uart_sig,sig_uart);     /*install signal handler*/
    timer_init( );                 /*initialize the timer*/
    . . .
```

The sig_dispatcher() requires two "helper" services, which are disable() and enable(). These two services are described in greater detail below, but briefly, they are used to enable and disable interrupts. A _settrap() service is used above to install trap handlers for the services. It should be noted, at this point, that as used herein, the distinction between interrupts and traps is that the former allow external devices and the timer facility to control microprocessor execution and are always asynchronous to microprocessor 202 execution, while the latter are intended to be used for certain events that occur during instruction execution and are generally synchronous to program execution. The timer_init routine above is not required by the signal dispatcher; rather, it is included to make the example more complete.

The interrupt() routine uses a method of assigning a signal number to a signal handler known as the "signal_associate" method, which is described in detail in the Mann article, supra, but a few additions are required to support the signal dispatcher. The modified code is shown below. There are two major changes: (1) interrupts are not disabled, requiring the Freeze mode handlers always to be used for interrupt deactivation, and (2) a call to a queue_sig routine, shown below, is made if the most significant bit of the signal number associated with the interrupt is set.

```
                    -continued
        pushsr  msp,it0,chd
        pushsr  msp,it0,chc
        pushsr  msp,it0,alu
        pushsr  msp,it0,ops
        push    msp,tav             ;push tav (gr121)
        ;
        mtsrim  chc,0               ;the trampoline code is
        const   it1,RegSigHand      ;described in section NO TAG
        consth  it1,RegSigHand      ;RegSigHand is a library
        load    0,0,it1,it1         ;variable
        add     it0,it1,4           ;IRET to signal
        mtsr    pc1,it1             ;trampoline code
        mtsr    pc0,it0
        iret
_signal_associate_end:
```

The queue_sig routine is shown below. It pushes the interrupt signal number onto the signal stack and advances a stack pointer, sig_stack_p. The operation is performed while the microprocessor 202 is still in Freeze mode and is therefore not interruptible. The dispatcher_running flag is then tested. If it is set to "TRUE" (i.e., signal dispatcher running), an interrupt return (IRET) instruction is executed; otherwise, the value of dispatcher_sig is obtained and the signal_associate code continues the process of starting a signal handler, but the signal number now in use will cause the signal dispatcher to commence execution.

```
_queue_sig:                              ;jump here from signal_associate
        and     it0,it0,0xff             ;clear msb-bit of signal number
;
        const   it3,_sig_stack_p
        consth  it3,_sig_stack_p
        load    0,0,it2,it3              ;get pointer value
        store   0,0,it0,it2              ;store signal number on stack
        add     it2,it2,4                ;advance stack pointer
        store   0,0,it2,it3
;
        const   it3,_dispatcher_running
        consth  it3,_dispatcher_running
        load    0,0,it2,it3              ;test if signal dispatcher
        cpeq    it2,it2,0                ;already running
        jmpt    it2,_start_dispatcher
        constn  it2,-1
        iret                             ;IRET if running
;
_start_dispatcher:
        store   0,0,it2,t3               ;set dispatcher_running
        const   it3,_dispatcher_sig
        consth  it3,_dispatcher_sig
        const   it1,_signal_associate_code+5*4
        consth  it1,_signal_associate_code+5*4
        jmpi    it1                      ;start signal handler
        load    0,0,it0,it3              ;signal=dispatcher_sig
```

Before the signal_associate code starts the signal dispatcher, the dispatcher_running flag is set to TRUE. Until this variable is cleared, further signal requests, if the most significant bit of the signal number is set, will be added to the stack of signals waiting for processing. Reducing the amount of code required results in less interrupt latency, as the queue_sig code runs in Freeze mode.

The signal handler that performs the dispatch operation is written in C. The code is shown below. It requires some simple assembly-level support routines, which will subsequently be described in detail. Writing the code in C is a convenience, as it simplifies the task of modifying the code, which will be necessary if a different execution schedule is required for signals waiting in the signal stack. The variables used in the signal dispatcher routine are described below. Note that sig_stack_p and dispatcher_running are defined volatile, because they may also be modified by a Freeze mode handler. It is important that the C compiler be informed of this possibility; otherwise, it may perform optimizations that prevent value changes from being observed, such as holding a copy of the sig_dispatcher_p in a register and repeatedly accessing the register.

```
extern void (*SigEntry[ ])(int);          /*defined in HIF libraries*/
int sig_stack[200];                       /*signal stack*/
volatile int *sig_stack_p=&sig_stack[0];
volatile int dispatcher_running;          /*dispatcher running flag*/
int sig_sig=0;
int dispatcher_sig;                       /*dispatcher signal number*/
```

The sig_dispatcher() routine first disables interrupts, before removing all current signals from the stack. The signal values are transferred to an array and interrupts are then reenabled. Performing this procedure with interrupts disabled prevents other signals from being added to the stack while the transfer is taking place. Signals are transferred to the array in the reverse order in which they were placed on the stack, thereby ensuring that interrupts are ultimately processed in the order in which they were originally requested.

No attempt is made to prioritize the interrupts in the stack. The necessary code can be applied after the signals have been removed from the stack. Performing priority ordering at C-level rather than in the sig_queue code is advantageous because it reduces interrupt latency. Due to the fast operation of 29K microprocessors, the need to prioritize interrupts is not great, as an interrupt request is not likely to be kept waiting very long.

```
void sig_dispatcher(sig)                  /*signal dispatcher*/
int sig;
{
        int     cps;
        int     *sig_p;                   /*array of signals*/
        static int sig_array[20];         /* needing processing*/
        cps=disable(0x20002);             /*set DI and TD in CPS*/
        for(;;)
        {       sig_p=&sig_array[0];      /*mark array empty*/
                while (sig_stack_p!=&sig_stack[0]);    /*remove signals from */
                {       --sig_stack_p;                 /* stack*/
                        *sig_p++=*(int*)sig_stack_p;   /*copy from*/
                }                                      /* stack to array*/
                enable(cps);                           /*enable interrupts*/
                while(sig_p!=&sig_array[0]);           /*process signals removed*/
                {       --sig_p;                       /* from stack*/
                        (*SigEntry[(*sig_p)-1])(*sig_p);
                }
                cps=disable(0x20002);                  /*disable interrupts*/
                if(sig_stack_p==&sig_stack[0])         /*stack empty?*/
                        break;
        }
        dispatcher_running=0;
        enable(cps);                                   /*enable interrupts*/
        _sigret( );                                    /*_sigret( ) HIF service*/
}                                                      /*would restore interrupted CPS*/
```

When there are no remaining interrupts to process, the dispatcher requests the _sigret() signal return service. The dispatcher_running flag is also cleared. The disable() and enable() support routines are used by the signal dispatcher to enable and disable interrupts around critical code. Interrupts are disabled by setting a "disable interrupt" (DI) bit in the CPS register. Freeze mode handler routines can use the _mtsr() C language extensions to modify special registers; however, they cannot be used by the signal dispatcher routine, as it may be operating in user mode. Accessing special register space from user mode would create a protection violation. The problem is overcome by installing assembly level trap handlers, which perform the necessary special register access. The __settrap() HIF service is used to install the trap handlers. Further assembly routines are required to assert the selected trap number. The code for disable() is shown below:

```
       .global_disable
__disable:
       asneq       218,gr96,gr96
       jmpi        lr0
       nop
       .global_disable
__disable:
       mfsr        gr96,ops        ;read OPS
       or          gr97, gr9, lr2  ;OR with passed value
       mtsr        ops, gr97
       iret                        ;Copy OPS to CPS
```

A single parameter is passed to disable(). The parameter is ORed with the CPS value and the CPS register is updated. Since this task is performed by a trap handler, a protected special purpose register of the microprocessor 202, the Old Processor Status (OPS) register (not shown) is modified and the modified contents of the OPS register are then copied to the CPS register when an IRET is issued. A further advantage of using a trap handler to perform this task is that the operation cannot be interrupted, as the read/modify/write of the CPS is atomic.

The code for the enable() routine is similar to that of the disable() routine. In this case, the passed parameter is simply copied to the CPS. The disable() routine returns the CPS value before modifying it. The value is normally stored and later passed to enable(). In this manner, only two bits of the CPS, the DI bit, which prevents the microprocessor 202 from being interrupted by external interrupt requests, and timer disable (TD) bit, which disables the timer interrupt, are temporarily modified.

```
       .global_enable
__enable:
       asneq       217, gr96, gr96
       jmpi        lr0
       nop
       .global_enable
__enable:
       mtsr        ops, lr2
       iret
```

It is understood that the present invention can take many forms and embodiments. The embodiments shown herein are intended to illustrate rather than to limit the invention, it being appreciated that variations may be made without departing from the spirit of the scope of the invention. For example, the method may be implemented, with slight modification, for use in microprocessors other than 29K microprocessors that have a mode equivalent to the Freeze mode of 29K processors. In addition, although the system of the present invention has been illustrated as being implemented using particular code segments, any number of different instructions and combination of instructions, as will be apparent to those skilled in the art, may be used to implement same.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of servicing a plurality of interrupts received by a microprocessor using C language interrupt handlers, the method comprising:

responsive to receipt of a first one of said interrupts, preparing a C level context of said microprocessor and initiating execution of a signal dispatcher;

responsive to receipt of each one of said interrupts:
placing said microprocessor in a freeze mode;
adding a signal number for identifying a C language signal handler associated with said received interrupt onto a signal queue stored in a memory electrically connected to said microprocessor while said microprocessor is in said freeze mode; and
subsequent to said adding, removing said microprocessor from said freeze mode;

determining whether said signal queue is empty;

if said signal queue is not empty, said signal dispatcher retrieving one of said signal numbers from said signal queue and calling said C language signal handler identified by said one of said signal numbers, said signal numbers being retrieved from said signal queue in the same order in which they were added to said signal queue; and if said signal queue is empty, exiting said signal dispatcher and restoring said microprocessor C level context.

2. The method of claim 1 further comprising:

while said microprocessor is in said freeze mode, determining whether execution of said C language signal handler associated with said received interrupt is necessary; and if execution of said C language signal handler associated with said received interrupt is not necessary, exiting said freeze mode and executing an interrupt return instruction.

3. The method of claim 1 wherein said preparing C level context of said microprocessor comprises:

saving contents of critical registers of said microprocessor on a memory stack in said memory; and preparing a register stack of said microprocessor for use by a C language signal handler.

4. A method of servicing interrupts generated by a plurality of I/O devices to a microprocessor using C language interrupt handlers, the method comprising:

responsive to receipt by said microprocessor of a first one of said interrupts, preparing a C level context of said microprocessor and initiating execution of a signal dispatcher;

responsive to receipt by said microprocessor of each one of said interrupts:
placing said microprocessor in a freeze mode;
while said microprocessor is in said freeze mode, adding a signal number associated with said received interrupt to a signal queue, said signal number identifying a C language signal handler comprising interrupt processing code for said received interrupt; and
subsequent to said storing, removing said microprocessor from said freeze mode;

said signal dispatcher periodically determining whether said signal queue is empty;

responsive to a determination that said signal queue is not empty, said signal dispatcher:

disabling said interrupts;

retrieving all of said signal numbers from said signal queue and storing said retrieved signal numbers in an array located in said memory;

enabling said interrupts; and sequentially retrieving said signal numbers from said array in the order in which they were added to said signal queue and executing said C language signal handlers identified thereby; and responsive to a determination that said signal queue is empty, exiting said signal dispatcher and restoring said microprocessor C level context.

5. The method of claim 4 wherein said signal numbers are stored in said array in an order based on a priority of said received interrupts with which they are associated.

6. The method of claim 4 wherein said signal numbers are stored in said array such that they are sequentially accessed in an order in which said associated received interrupts were received.

7. The method of claim 4 further comprising, responsive to receipt by said microprocessor of each of said interrupts and prior to said storing said signal number associated with said received interrupt in said signal queue;

determining whether execution of said C language signal handler comprising interrupt processing code for said received interrupt is necessary; and if said execution of said C language signal handler comprising interrupt processing code for said received interrupt is not necessary, removing said microprocessor from freeze mode and executing an interrupt return instruction.

8. A method of servicing interrupts in a microprocessor device using C language interrupt handlers, wherein said microprocessor device comprises a microprocessor, a memory and a plurality of input/output (I/O) devices interconnected via data and address buses, said microprocessor being further connected to said I/O devices via a plurality of interrupt lines for receiving interrupts from said I/O devices, the method comprising:

responsive to receipt of an interrupt from one of said I/O devices, causing said microprocessor to enter a freeze mode;

executing a first stage of a C language interrupt handler associated with said received interrupt while said microprocessor is in said freeze mode, wherein during said first stage, a signal number for identifying a second stage of said associated C language interrupt handler is added to a signal queue stored in said memory, wherein said second stage of said associated C language interrupt handler comprises interrupt processing code for said received interrupt;

determining whether a signal dispatcher is executing;

if said signal dispatcher is executing, causing said microprocessor to exit said freeze mode and executing an interrupt return instruction; and if said signal dispatcher is not executing:

causing said microprocessor to exit said freeze mode;

initiating execution of said signal dispatcher;

said signal dispatcher retrieving said signal number from said signal queue and calling said identified second stage of said associated C language interrupt handler;

said signal dispatcher checking said signal queue to determine whether said signal queue is empty;

if said signal queue is not empty, said signal dispatcher retrieving a next signal number from said signal queue and calling a second stage of a C level interrupt handler identified by said next signal number; and if said signal queue is empty, exiting said signal dispatcher and restoring C level context;

wherein said signal numbers are retrieved from said signal queue in the order in which they were added thereto.

9. The method of claim 9 wherein said first stage further comprises:

prior to said signal number for identifying said second stage of said associated C language interrupt handler being added to said signal queue, determining whether execution of said second stage of said associated C language interrupt handler is necessary; and if execution of said second stage of said associated C language interrupt handler is not necessary, causing said microprocessor to exit said freeze mode and executing an interrupt return instruction.

10. The method of claim 8 wherein said signal dispatcher is a signal handler.

11. The method of claim 8 further comprising:

preventing said microprocessor from receiving interrupts from said I/O devices;

while said microprocessor is prevented from receiving interrupts from said I/O devices:

removing a plurality of signal numbers from signal queue; and storing said removed signal numbers in an array in said memory; and enabling said microprocessor to receive interrupts from said I/O devices;

said signal dispatcher sequentially accessing said signal numbers from said array and calling a second stage of a C level interrupt handler identified by said accessed signal number.

12. The method of claim 11 wherein said storing comprises storing said removed signal numbers in said array based on a priority thereof.

13. The method of claim 11 wherein said storing comprises storing said retrieved signal numbers in said array in an order in which they were added to said signal queue.

14. A system for handling multiple interrupts comprising:

a microprocessor capable of operating in a freeze mode;

a memory electrically connected to said microprocessor:

at least one input/output (I/O) device electrically connected to said microprocessor, said at least one I/O device transmitting interrupts to said microprocessor when said at least one I/O device is in need of servicing;

a plurality of C language interrupt handlers stored in said memory, each of said C language interrupt handlers comprising a freeze mode handler for execution while said microprocessor is in said freeze mode and a signal handler, wherein each of said C language interrupt handlers is associated with one of said interrupts;

a signal dispatcher stored in said memory for calling appropriate ones of said signal handlers for execution;

means responsive to receipt by said microprocessor of a first one of said interrupts for preparing a C level context of said microprocessor and initiating execution of said signal dispatcher;

means responsive to receipt by said microprocessor of each one of said interrupts for placing said microprocessor in said freeze mode; while said microprocessor is in said freeze mode, adding a signal number for identifying said signal handler of said C language interrupt handler associated with said received interrupt to a signal queue stored in said memory, and subsequent to said adding, removing said microprocessor from said freeze mode;

means for periodically determining whether said signal queue is empty;

means for exiting said signal dispatcher and restoring said microprocessor C level context if said if said signal queue is empty; and means for retrieving one of said signal numbers from said signal queue and calling said signal handler identified by said one of said signal numbers if said signal queue is not empty;

wherein said signal numbers are retrieved from said signal queue in the same order in which they were added thereto.

15. The system of claim 14 further comprising:

means for determining whether execution of said signal handler of said C language interrupt handler associated with said received interrupt is necessary; and means for exiting said freeze mode and executing an interrupt return instruction if execution of said signal handler of said C language interrupt handler associated with said received interrupt is not necessary.

16. The system of claim 14 wherein said means for preparing C level context of said microprocessor further comprises:

means for saving contents of critical registers of said microprocessor on a memory stack in said memory; and means for preparing a register stack of said microprocessor for use by a C language interrupt handler.

17. A system for servicing interrupts in a microprocessor device using C language interrupt handlers, wherein said microprocessor device comprises a microprocessor, a memory and a plurality of input/output (I/O) devices interconnected via data and address buses, said microprocessor being further connected to said I/O devices via a plurality of interrupt lines for receiving interrupts from said I/O devices, the system comprising:

means responsive to receipt of an interrupt from one of said I/O devices for causing said microprocessor to enter a freeze mode;

means for executing a first stage of a C language interrupt handler associated with said received interrupt while said microprocessor is in said freeze mode, wherein during said first stage, a signal number for identifying a second stage of said associated C language interrupt handler is added to a signal queue stored in said memory, wherein said second stage of said associated C language interrupt handler comprises interrupt processing code for said received interrupt;

means for determining whether a signal dispatcher is running;

means for causing said microprocessor to exit said freeze mode and for executing an interrupt return instruction if said signal dispatcher is running; and means responsive to said signal dispatcher's not running for causing said microprocessor to exit said freeze mode and initiating execution of said signal dispatcher if said signal dispatcher is not running;

means for retrieving said signal number from signal queue and calling said identified second stage of said associated C language interrupt handler;

means for checking said signal queue to determine whether said signal queue is empty;

means for retrieving a next signal number from said signal queue and calling a second stage of a C level interrupt handler identified by said next signal number if said signal queue is not empty; and means for exiting said signal dispatcher and restoring C level context of said signal queue is empty;

wherein said signal numbers are retrieved from said signal queue in the same order in which they were added thereto.

18. The system of claim 17 further comprising:

means for determining whether execution of said second stage of said associated C language interrupt handler is necessary; and means for causing said microprocessor to exit said freeze mode and for executing an interrupt return instruction if execution of said second stage of said associated C language interrupt handler is not necessary.

19. The system of claim 17 wherein said signal dispatcher is a signal handler.

20. The system of claim 17 further comprising:

means for preventing said microprocessor from receiving interrupts from said I/O devices;

means for retrieving a plurality of signal numbers from signal queue;

means for storing said retrieved signal numbers in an array in said memory while said microprocessor is prevented from receiving interrupts from said I/O devices;

means for enabling said microprocessor to receive interrupts from said I/O devices once said plurality of signal numbers have been retrieved from said signal queue and stored in said array; and means for sequentially accessing said signal numbers from said array in the same order in which said signal numbers were added to said signal queue and calling a second stage of a C level interrupt handler identified by said accessed signal number.

21. The system of claim 20 wherein said storing means comprises means for storing said removed signal numbers in said array based on a priority thereof.

22. A method of servicing a plurality of interrupts received by a microprocessor using C language interrupt handlers, the method comprising:

responsive to receipt of a first one of said interrupts, preparing a C level context of said microprocessor and initiating execution of a signal dispatcher;

responsive to receipt of each one of said interrupts:
  placing said microprocessor in a freeze mode;
  operating on a first stage associated with said interrupt, said first stage including capturing any critical data and deactivating an interrupt request associated with the interrupt
  determining if said interrupt has a second stage associated therewith, said second stage comprising a C language signal handler,
  if said second stage exists, adding a signal number for identifying said second stage onto a signal queue stored in a memory electrically connected to said microprocessor while said microprocessor is in said freeze mode; and
  removing said microprocessor from said freeze mode;

determining whether said signal queue is empty;

if said signal queue is not empty, said signal dispatcher retrieving one of said signal numbers from said signal queue and calling said second stage identified by said one of said signal numbers, said signal numbers being retrieved from said signal queue in the same order in which they were added to said signal queue; and if said signal queue is empty, exiting said signal dispatcher and restoring said microprocessor C level context.

* * * * *

UNITED STATES PATENT AND TRADEMARK OFFICE
CERTIFICATE OF CORRECTION

PATENT NO. : 5,644,772              PAGE  1  of  6

DATED : JULY 1, 1997

INVENTOR(S) : MANN

It is certified that error appears in the above-identified patent and that said Letters Patent is hereby corrected as shown below:

Title page, [57] ABSTRACT, line 3: "handier" should read --handler--

Col. 3, line 56: "iof" should read --of--

Col. 3, line 60: "alwayx" should read --always--

Col. 3, line 64: "leanguage" should read --language--

Col. 10, line 1: "tick" should read --TICK--

Col. 10, line 2: "tick" should read --TICK--

Col. 10, line 3: "timer_sig" should read --TIMER_SIG--

Col. 10, lines 10-11: "sig_uart()" should read --SIG_UART()--

Col. 10, line 28: "_sigret()" should read --_SIGRET()--

Col. 10, lines 35-36: "dispatcher_running" should read --DISPATCHER_RUNNING--

Col. 10, line 36: insert --is-- after the word "dispatcher"

Col. 10, line 47: "sig_sig" should read --SIG_SIG--

UNITED STATES PATENT AND TRADEMARK OFFICE
CERTIFICATE OF CORRECTION

PATENT NO. : 5,644,772

DATED : JULY 1, 1997

INVENTOR(S) : MANN

It is certified that error appears in the above-identified patent and that said Letters Patent is hereby corrected as shown below:

Col. 10, line 49: "sigret()" should read --SIGRET()--

Col. 10, line 60: "dispatcher_sig" should read --DISPATCHER_SIG--

Col. 10, line 63: "signal()" should read --SIGNAL()--

Col. 10, line 64: "sig_dispatcher" should read --SIG_DISPATCHER--

Col. 11, line 1: "main()" should read --MAIN()--

Col. 11, line 3: "interrupt()" should read --INTERRUPT()--

Col. 11, line 4: "(sig_timer()" should read --(SIG_TIMER()--

Col. 11, line 5: "interrupt()" should read --INTERRUPT()--

Col. 11, line 6: "timer_sig" should read --TIMER_SIG--

Col. 11, line 8: "timer_sig" should read --TIMER_SIG--

Col. 11, line 9: "interrupt()" should read --INTERRUPT()--

Col. 11, lines 10-11: "timer_handler()" should read --TIMER_HANDLER()--

UNITED STATES PATENT AND TRADEMARK OFFICE
CERTIFICATE OF CORRECTION

PATENT NO. : 5,644,772

DATED : JULY 1, 1997

INVENTOR(S) : MANN

It is certified that error appears in the above-identified patent and that said Letters Patent is hereby corrected as shown below:

Col. 11, line 16: "signal()" should read --SIGNAL()--

Col. 11, line 16: "interrupt()" should read --INTERRUPT()--

Col. 11, line 17: "sig_uart()" should read --SIG_UART--

Col. 11, line 21: "interrupt()" should read --INTERRUPT()--

Col. 11, line 31 (chart): "handier" should read --handler--

Col. 11, line 41: "sig_dispatcher()" should read --SIG_DISPATCHER()--

Col. 11, line 42: "disable()" should read --DISABLE()--

Col. 11, line 42: "enable()" should read --ENABLE()--

Col. 11, line 44: "_settrap()" should read --_SETTRAP()--

Col. 11, line 54: "timer_init" should read --TIMER_INIT--

Col. 11, line 57: "interrupt()" should read --INTERRUPT()--

Col. 11, line 58: "signal_associate" should read --SIGNAL_ASSOCIATE--

Col. 11, line 64: "queue_sig" should read --QUEUE_SIG--

UNITED STATES PATENT AND TRADEMARK OFFICE
CERTIFICATE OF CORRECTION

PATENT NO. : 5,644,772

DATED : JULY 1, 1997

INVENTOR(S) : MANN

It is certified that error appears in the above-identified patent and that said Letters Patent is hereby corrected as shown below:

Col. 12, line 56: "queue_sig" should read --QUEUE_SIG--

Col. 12, line 58: "sig_stack_p" should read --SIG_STACK_P--

Col. 12, line 60: "dispatcher_running" should read --DISPATCHER_RUNNING--

Col. 12, line 63: "dispatcher_sig" should read --DISPATCHER_SIG--

Col. 12, line 64: "signal_associate" should read --SIGNAL_ASSOCIATE--

Col. 13, line 25: "signal_associate" should read --SIGNAL_ASSOCIATE--

Col. 13, line 26: "dispatcher_running" should read --DISPATCHER_RUNNING--

Col. 13, line 32: "queue_sig" should read --QUEUE_SIG--

Col. 13, line 66: "sig_stack_p" should read --SIG_STACK_P--

Col. 13, line 66: "dispatcher_running" should read --DISPATCHER_RUNNING--

Col. 14, line 4: "sig_dispatcher_p" should read --SIG_DISPATCHER_P--

Col. 14, line 15: "sig_dispatcher()" should read --SIG_DISPATCHER()--

Col. 14, line 28: "sig_queue" should read --SIG_QUEUE--

UNITED STATES PATENT AND TRADEMARK OFFICE
CERTIFICATE OF CORRECTION

PATENT NO. : 5,644,772

DATED : JULY 1, 1997

INVENTOR(S) : MANN

It is certified that error appears in the above-identified patent and that said Letters Patent is hereby corrected as shown below:

Col. 14, line 33 (chart): "sig_dispatcher" should read --SIG_DISPATCHER--

Col. 14, line 60: "_sigret()" should read --_SIGRET()--

Col. 14, line 61: "dispatcher_running" should read --DISPATCHER_RUNNING--

Col. 14, line 61: "disable()" should read --DISABLE()--

Col. 14, line 62: "enable()" should read --ENABLE()--

Col. 15, line 4: "_settrap()" should read --_SETTRAP()--

Col. 15, line 7: "disable()" should read --DISABLE()--

Col. 15, line 18: "Copy" should read --copy--

Col. 15, line 20: "disable()" should read --DISABLE()--

Col. 15, line 30: "enable()" should read --ENABLE()--

Col. 15, line 31: "disable()" should read --DISABLE()--

Col. 15, line 32: "disable()" should read --DISABLE()--

UNITED STATES PATENT AND TRADEMARK OFFICE
CERTIFICATE OF CORRECTION

PATENT NO. : 5,644,772

DATED : JULY 1, 1997

INVENTOR(S) : MANN

It is certified that error appears in the above-identified patent and that said Letters Patent is hereby corrected as shown below:

Col. 15, line 34: "enable()" should read --ENABLE()--

Col. 19, line 10, claim 14: delete "if said" (first occurrence) after the word "context"

Col. 20, line 8, claim 17: "of" should read --if--

Signed and Sealed this

Seventh Day of July, 1998

Attest:

Attesting Officer

BRUCE LEHMAN

Commissioner of Patents and Trademarks